US008552744B2

(12) United States Patent
Michalski et al.

(10) Patent No.: US 8,552,744 B2
(45) Date of Patent: Oct. 8, 2013

(54) PROPAGATION TIME MEASURING METHOD FOR DETERMINING A DISTANCE

(75) Inventors: Bernhard Michalski, Maulburg (DE); Dominik Buser, Thürneu (CH); Stefan Scherr, Kandern (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 822 days.

(21) Appl. No.: 11/992,227

(22) PCT Filed: Sep. 1, 2006

(86) PCT No.: PCT/EP2006/065937
§ 371 (c)(1),
(2), (4) Date: Sep. 26, 2011

(87) PCT Pub. No.: WO2007/033897
PCT Pub. Date: Mar. 29, 2007

(65) Prior Publication Data
US 2012/0056628 A1 Mar. 8, 2012

(30) Foreign Application Priority Data
Sep. 19, 2005 (DE) .......................... 10 2005 044 724

(51) Int. Cl.
*G01R 27/04* (2006.01)
(52) U.S. Cl.
USPC ............ 324/644; 324/629; 324/637; 324/642
(58) Field of Classification Search
USPC .................................. 324/615–646
See application file for complete search history.

(56) References Cited

U.S. PATENT DOCUMENTS

| | | |
|---|---|---|
| 5,537,121 A | 7/1996 | Lennen |
| 5,563,605 A | 10/1996 | McEwan |
| 5,841,666 A | 11/1998 | Perdue |
| 6,373,428 B1 * | 4/2002 | McEwan ....................... 342/175 |
| 6,559,657 B1 * | 5/2003 | McCarthy et al. ............. 324/642 |
| 6,628,229 B1 | 9/2003 | Johnson |
| 6,868,357 B2 * | 3/2005 | Furse ............................. 702/108 |
| 7,135,873 B2 * | 11/2006 | McCosh ....................... 324/644 |
| 2002/0133303 A1 * | 9/2002 | Heidecke ........................ 702/55 |
| 2003/0112020 A1 * | 6/2003 | Yankielun et al. ............. 324/644 |
| 2005/0168379 A1 * | 8/2005 | Griessbaum et al. ......... 342/124 |
| 2006/0004177 A1 | 1/2006 | Gao |
| 2009/0302867 A1 * | 12/2009 | Schroth et al. ................ 324/642 |

FOREIGN PATENT DOCUMENTS

| | | |
|---|---|---|
| DE | 31 07 444 A1 | 10/1982 |
| DE | 19949992 A1 * | 5/2001 |
| DE | 102 52 091 A1 | 5/2004 |
| EP | 0 573 034 A2 | 12/1993 |
| WO | WO 2004/013584 A1 | 2/2004 |

* cited by examiner

*Primary Examiner* — Jermele M Hollington
*Assistant Examiner* — Adam Clarke
(74) *Attorney, Agent, or Firm* — Bacon & Thomas, PLLC

(57) ABSTRACT

An apparatus for ascertaining and monitoring a fill level and includes a transmitting/receiving unit and a delay circuit. The delay circuit includes at least a sampling clocking oscillator, which produces a sampling signal having a sampling frequency, a transmission clocking oscillator, which produces a pulse repetition signal having a pulse repetition frequency, and a frequency converter, which produces by means of sequential sampling a difference signal. The apparatus further includes a control/evaluation unit, which determines on the basis of travel time the fill level. Provided on the control/evaluation unit is an external clocking input, which is connected via a clocking line with a first clocking output of the sampling clocking oscillator or with a second clocking output of the transmission clocking oscillator. A stabilized and cost-favorable control circuit for producing an intermediate frequency signal with a highly accurately determinable, transformation factor results.

10 Claims, 2 Drawing Sheets

State of the Art

PROPAGATION TIME MEASURING METHOD FOR DETERMINING A DISTANCE

TECHNICAL FIELD

The present invention relates to an apparatus for ascertaining and monitoring the fill level of a fill substance in a container.

BACKGROUND DISCUSSION

Such apparatuses for determining and monitoring fill level in a container are often used in measuring devices in automation- and process control-technology. For example, measuring devices under the names Micropilot, Prosonic and Levelflex are produced and sold by Endress+Hauser. These measuring devices function according to the travel-time measurement method, and serve for determining and/or monitoring a fill level of a medium in a container. In the travel time measuring method, for example, microwaves, or radar waves, are transmitted via an antenna into the process space or are guided on a surface waveguide extending into the fill substance, and the reflected echo waves are received back by the antenna, or measurement transmitter, following a distance-dependent, travel time of the signals. From the time difference between the transmission of the high frequency signals and receipt of the reflected, echo signals, the distance from the measuring device to the surface of the medium can be ascertained. Apparatuses and methods for determining fill level via the travel time of measurement signals utilize the physical principle, according to which travel distance is equal to the product of travel time and propagation velocity. Taking into consideration the geometry of the interior of the container, the fill level of the medium can be ascertained as a relative or absolute variable. The travel-time method can be subdivided into essentially two basic methods: Thus, one method involves measuring the time difference, which a pulse-modulated, high frequency, measuring signal requires for the traveled path; another widely distributed ascertainment method involves the determining of the sweep-frequency difference of the transmitted, continuous, high frequency signal relative to the reflected, received, high frequency signal (FMCW—Frequency-Modulated Continuous Wave). In the following, no limitation to a particular ascertainment method is intended, but, instead, a travel time method, in general, is applied.

A general problem in the case of all travel time measuring methods utilizing high frequency measuring signals in the GHz range is that, for evaluating the high frequency, total measuring signal, composed of transmitted measuring signals and reflected, echo signals, high frequency building blocks must be used, designed for such high frequency ranges. A solution for this problem involves sequential sampling, which produces from a plurality of such high frequency, sampled, measuring signals, by sampling the recorded, sampled measuring signals in defined, periodic intervals, a time-expanded, intermediate frequency signal. This additional processing of the high frequency measuring signals is performed, because there are no appropriately cost-favorable, data processing units, e.g. DSPs (digital signal processors), which can reliably process high frequency measuring signals.

In the present state of the art, there are a number of approaches for producing a low frequency, intermediate frequency signal from a plurality of sampled measurement signals by a method of sequential sampling, or sampling method. Time expansion, or time delay, by means of sequential sampling is based on making sure that the time difference between two sampling points is constant to a high degree. For a long time, two methods have been known that are suitable for realizing this requirement, these being the mixer principle and the ramp principle, with the ramp principle being quantized and working only approximately continuously.

Thus, a first approach for producing a time-expanded, intermediate frequency signal is the mixer principle, in the case of which two oscillators produce two oscillations of slightly different frequencies. By the slight difference of the frequencies of the two oscillations, a linear phase shift is obtained which rises with each measuring period, this corresponding to a linearly increasing time delay.

The mixer principle is described, for example, in DE 31 07 444 A1 in the context of a high resolution, pulse radar method. A generator produces first microwave pulses and radiates them via an antenna at a predetermined transmission repetition frequency in the direction of the surface of the fill substance. Another generator produces reference microwave pulses, which are equal to the first microwave pulses, except that their transmission repetition frequency is slightly different. The echo signal and the reference signal are mixed, for example, by a frequency converter, or mixer, whereby an intermediate frequency signal is obtained. The intermediate frequency signal has the same behavior as the echo signal except that it is time expanded in comparison therewith by a translation factor equal to a quotient of the transmission repetition frequency and the frequency difference between the repetition frequency, or pulse repetition frequency, of the first microwave pulses and the repetition frequency, or sampling frequency, of the reference microwave pulses. In the case of a transmission repetition frequency of some megahertz, a frequency difference of a few hertz and a microwave frequency of some gigahertz, the frequency of the intermediate frequency signal lies well below 100 kilohertz. The advantage of the transformation to the intermediate frequency is that relatively slow, and, therefore, cost-favorable, electronic components can be used for signal registering and/or signal evaluation. Referenced also in this connection is the German Gebrauchsmuster DE 29815069 U1, which describes the known transformation technology in the case of a TDR, fill-level, measuring device. This sampling circuit has two oscillators, of which at least one is embodied to have a variable frequency, with one oscillator controlling the transmission generator and the other oscillator controlling the sampling pulse generator. A frequency mixer forms from the two frequencies the difference used for setting, or controlling, the time expansion factor, which is as constant as possible, to a desired value.

Another apparatus for time transformation of high-frequency measuring signals is disclosed in WO 2004/013584 A1. In this case, the frequency shift between the pulse repetition frequency and the sampling frequency is produced by two phase-coupled control loops having differently adjusted forwards and backwards dividers, the so-called phase-locked loop.

In the case of the second approach—the ramp principle—, the time difference equidistant from sampling point to sampling point is produced with the assistance of an RC member. The RC member is pre-charged by a step-shaped or linearly rising, ramp voltage, receives, thus, a certain offset, and is, then, charged and discharged in the rhythm of the transmission repetition frequency. With increasing ramp voltage, the voltage offset in the RC members increases, whereby the reaching of the switching threshold is delayed as a function of the level of the ramp voltage. The time expansion factor, or the transformation factor, is, in the ramp principle, definitively dependent on the time constant of an RC member. The dependence of the RC member on temperature acts fully on the scaling of the time transformation. In order, approximately, to remove this problem, it is necessary to compensate the temperature-related changes via a control loop. But, even with this measure, the scaling of the time transformation changes as a function of temperature in such a manner that the requirements for highly accurate measurements are not fulfilled. This ramp principle is disclosed in U.S. Pat. No. 5,563,605. The construction of the phase delay circuit disclosed therein has the disadvantage that considerable phase jitter, or instabilities, occur in the clocking frequencies. A further, general disadvantage facing the ramp principle is the considerable effort that must be expended to produce the ramp voltage.

SUMMARY OF THE INVENTION

An object of the invention is to provide an apparatus and a method with a stabilized and cost-favorable, control circuit for producing an intermediate frequency signal with a highly accurately determinable transformation factor.

Such object is achieved according to the invention by the features that, provided on the control/evaluation unit is an external, clock-signal input, which is connected via a clock-signal line with a first clock-signal output of the sampling clocking oscillator or with a second clock-signal output of the transmission clocking oscillator, so that the clocking of the control/evaluation unit is done with the sampling signal at the sampling frequency or the pulse repetition signal with the pulse repetition frequency. The apparatus of the invention increases the accuracy of measurement by running the microcontroller clock-synchronously with a controlled oscillator. In this way, fewer sources of error are contained in the control system, and, by omitting the processor oscillator, energy, costs and space on the circuit board are saved.

An advantageous form of embodiment of the solution of the invention is one in which the sampling clocking oscillator is embodied to be controllable. Due to the ability to control the sampling oscillator, it is possible to establish a control of the frequency difference between the transmission clocking oscillator and the sampling clocking oscillator by, for example, the control/evaluation unit. By a control signal of the control/evaluation unit, the sampling frequency of the sampling clocking oscillator is so controlled that the desired frequency difference between the frequencies of the transmission signal and the sampling signal is obtained.

In an especially preferred form of embodiment of the invention, it is provided that a control output is provided on the control/evaluation unit, for controlling or triggering the sampling clocking oscillator via a control line leading to a control input on the sampling clocking oscillator.

An effective embodiment of the invention is one in which an integrating member is provided in the control line between the control input of the sampling clocking oscillator and the control output of the control/evaluation unit for forming from the digital control output signals of the control/evaluation unit a corresponding integral value. By this integrating member, especially a lowpass, for example, the digital control signals of the control/evaluation unit are converted to a corresponding direct voltage signal, which can be applied for controlling a voltage-controlled oscillator VCO.

An advantageous form of embodiment of the apparatus of the invention is one in which the sampling clocking oscillator is embodied as a voltage-controlled oscillator. For example, conventionally marketed, voltage-controlled oscillators VCO are used as controllable oscillators, or a capacitance diode is applied in parallel with a quartz oscillator. The capacitance of the capacitance diode can be set by the applied direct voltage and, thereby, the oscillation frequency changes.

In an advantageous form of embodiment of the apparatus of the invention, it is provided that the sampling clocking oscillator is embodied as a numerically controlled oscillator. This type of controllable oscillator can be controlled directly by the digital, controlling signal of the control/evaluation unit.

Further, another form of the invention provides that a highly accurate, stable oscillator with a stable pulse repetition frequency is provided as transmission clocking oscillator. By applying a highly accurate transmission clocking oscillator, an exact time base for ascertaining distance (distance being determined from the travel time of the measuring signals and their propagation velocity) is created, whereby measuring accuracies of distance in the millimeter range are possible.

In an advantageous form of embodiment of the apparatus of the invention, it is provided that the frequency converter is embodied as an analog mixer.

A further advantageous form of embodiment of the apparatus of the invention is one in which the frequency converter is embodied as a digital mixer.

A very advantageous variant of the apparatus of the invention is one in which a divider or a multiplier is embodied in the clocking line between the clocking input of the control/evaluation unit and the clocking output of the sampling clocking oscillator. According to its setting, the divider or multiplier changes the sampling frequency of the sampling signal.

BRIEF DESCRIPTION OF THE DRAWINGS

The invention will now be explained in greater detail on the basis of the appended drawing. For simplification, identical parts in the drawing are provided with equal reference characters. The figures show as follows.

DETAILED DISCUSSION IN CONJUNCTION WITH THE DRAWINGS

Figure 1:
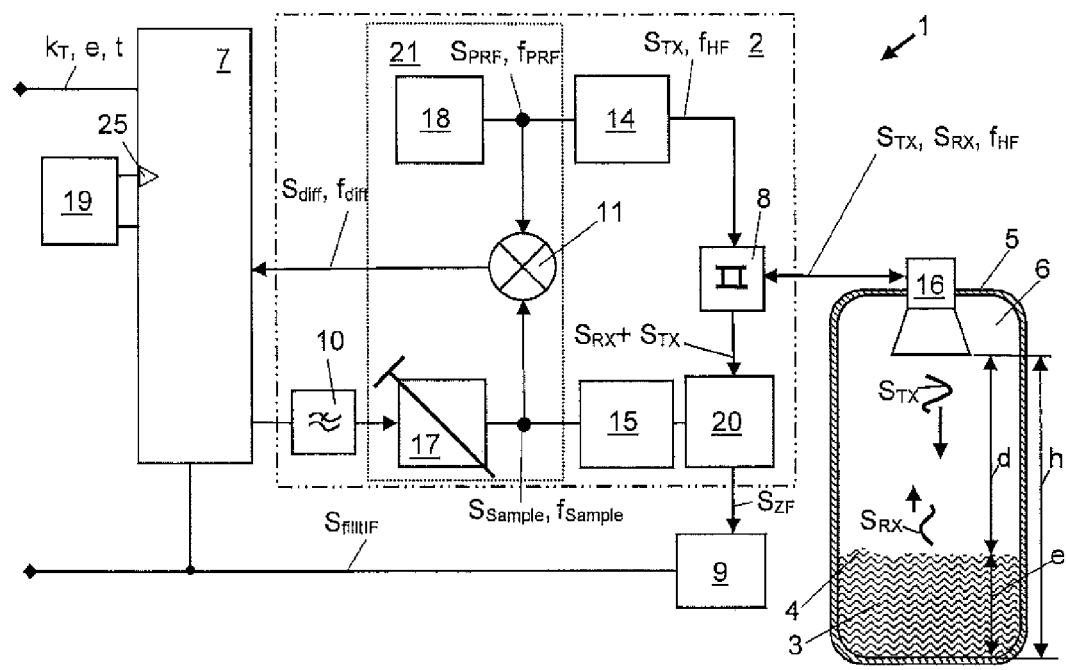
FIG. 1 is a block diagram of an example of an embodiment of the apparatus of the invention for ascertaining fill level in a container.

Shown in FIG. 1 is an example of an embodiment of a block diagram of the apparatus 1 of the invention for determining distance d, or fill level e, on the basis of travel time t. For this, the apparatus 1 includes a transducer element 16 connected with the transmission/receiving unit 2 for coupling and transmitting the high frequency measuring signal, or transmission signal, $S_{TX}$ into a measuring volume 6 of the container 5 containing the fill substance 3. The frequency of the pulsed transmission signal $S_{TX}$ lies, in such case, as usual for apparatuses of such type working with microwaves, in a frequency range of some gigahertz, especially in the frequency range of 0.5 GHz to 30 GHz. Also higher frequency ranges, e.g. of about 76 GHz, are usable for operating such measuring systems working with microwaves for ascertaining fill level.

The transducer element 16 can, as shown in FIG. 1, be embodied as an antenna 16a, especially a horn antenna, a rod antenna, a parabolic antenna, or also a planar antenna, which radiates the transmission signal $S_{TX}$ into the measuring volume 6 of the container 5. Instead of such antennas radiating into the free space of the measuring volume 6, also transmission signals $S_{TX}$ guided on surface waveguides 16b can be used in the apparatus 1 for fill level measurement, this, however, not being shown explicitly in FIG. 1.

In the method of guided microwaves, e.g. the time-domain reflectometry, or TDR, measuring method, a high-frequency pulse is transmitted, for example, along a Sommerfeld, or Goubau, surface waveguide 16b or coaxial waveguide, and, at a discontinuity of the DK (dielectric constant) value of the fill substance 3 surrounding the surface waveguide 16b, the pulse is partially reflected back. Due to impedance jumps within the measuring volume 6 of the container 5, and especially at the interface between free space and the fill substance 3 in the container 6, the transmission signal $S_{TX}$ is, at least partially, reflected back and, consequently, a corresponding reflection signal $S_{RX}$ travels back on the surface waveguide 16b, in the opposite direction.

In the time-difference measuring of pulsed, high-frequency measuring signals, a transmitting/receiving unit 2 coupled to the transducer element 16 is applied for producing and processing mutually coherent, wave packets of predeterminable pulse form and pulse width, so-called bursts, as well as for generating, by means of the bursts, an analog, time-expanded, intermediate frequency signal $S_{IF}$ influenced by the fill level e. The pulse form of an individual burst corresponds, usually, to needle-shaped or sinusoidal, half-wave pulses of predeterminable pulse width; here, however, in case required, also other suitable pulse forms can be applied for the bursts.

The electrical/electronic structure of the apparatus 1 is composed mainly of at least one transmitting/receiving unit 2, a control/evaluation unit 7, and a filter/amplifier unit 9. The transmitting/receiving unit 2 can, in turn, be subdivided into an HF-circuit portion, with transmission pulse generator 14, sampling pulse generator 15, sampling circuit 20, and transmitting/receiving duplexer 8, where primarily HF-signals are produced and processed, and an LF-circuit portion, with transmission clocking oscillator 18, sampling clocking oscillator 17, mixer 11, and, if beneficial, an integrating member 10, where primarily LF-signals are produced and processed. The individual circuit elements in the HF-circuit portion are built, according to the invention, in analog circuit technology, i.e. analog measuring signals are produced and processed. In contrast, the individual circuit elements in the LF-circuit portion can be built either on the basis of digital circuit technology and/or analog circuit technology. Considering the rapid progress of digital signal processing, it is also conceivable that the HF-region can be embodied with digital circuit elements. The most varied of particular circuit elements are options in digital and analog circuit technology, but are not explicitly detailed here. The following description of a form of embodiment is to be considered only as an example of many possible opportunities for embodiment.

The transmitting/receiving unit 2 includes, according to FIG. 1, a transmission pulse generator 14 for producing a first burst sequence serving as a transmission signal $S_{TX}$. The transmission signal $S_{TX}$ is, as usual for such apparatuses 1, carried with a center high-frequency $f_{HF}$ lying about in the range between 0.5 and 30 GHz, and clocked with a pulse repetition frequency $f_{PRF}$, or firing rate, tuned to a frequency range of some megahertz, especially a frequency range of 1 MHz to 10 MHz. This pulse repetition frequency $f_{PRF}$ is produced by a transmission clocking oscillator 18 for controlling the transmission pulse generator 14. The high-frequency $f_{HF}$ and/or pulse repetition frequency $f_{PRF}$ can, however, also, in case required, lie above the respectively given frequency ranges.

The transmission signal $S_{TX}$ lying on the signal output of the transmission pulse generator 14 is coupled by means of a transmitting/receiving duplexer 8, especially by means of a directional coupler, or a hybrid-coupler, of the transmitting/receiving unit 2, into the transducer element 16 connected to a first signal output of the transmitting/receiving duplexer 8. Practically at the same time, the transmission signal $S_{TX}$ lies also on the second signal output of the transmitting/receiving duplexer 8. The transmission pulse generator 14 and the sampling pulse generator 15 are embodied as conventionally marketed, analog, HF-oscillators, e.g. quartz oscillators, phase-coupled oscillator circuits, or surface acoustic wave filters (SAW).

The reflected measuring signals $S_{RX}$ produced in the above described manner in the measuring volume 6 of the container 5 are, as already mentioned, received back by the apparatus 1 by means of the transducer element 16 and are coupled out at the second signal output of the transmitting/receiving duplexer 8. Accordingly, a total measuring signal $S_{TX}+S_{RX}$ formed by means of the transmission signal $S_{TX}$ and the reflected measuring signal $S_{RX}$ can be tapped at the second signal output of the transmitting/receiving duplexer 8.

As usual in the case of such apparatuses 1, the high-frequency $f_{HF}$ and/or the pulse repetition frequency $f_{PRF}$ of the transmission signal $S_{TX}$ are/is set so high, that a direct evaluation of the total measuring signal $S_{TX}+S_{RX}$ lying on the second signal output of the transmitting/receiving duplexer 8, especially a direct measuring of the travel time t, is, for practical purposes, no longer possible, or only possible with high technical effort, e.g. by employing high-frequency electronics components. Because of this, the transmitting/receiving unit 2 further includes a sampling circuit 20 and a delay circuit 21, which together serve for time-expanding the high-frequency-carried, total measuring signal $S_{TX}+S_{RX}$, and, indeed, in such a manner that the high-frequency $f_{HF}$ and the pulse repetition frequency $f_{PRF}$ are transformed into a low frequency range of a couple of hundred kilohertz.

For time expanding the total signal $S_{TX}+S_{RX}$, it is fed to a first signal input of the sampling circuit 20 connected with the second signal output of the transmitting/receiving duplexer 8. Simultaneously with the total signal $S_{TX}+S_{RX}$, a burst sequence of the sampling oscillator 17, serving as a sampling signal $S_{Sample}$, is applied to a second signal input of the sampling circuit 20. A sampling frequency $f_{Sample}$, or clock rate, with which the sampling signal $S_{Sample}$ is clocked, is, in the normal case, set somewhat smaller then the pulse repetition frequency $f_{PRF}$ of the transmission signal $S_{TX}$.

By means of the sampling circuit 20, the total signal $S_{TX}+S_{RX}$ is mapped onto an intermediate frequency signal $S_{IF}$, which is time expanded by a transformation factor $K_T$ relative to the total measuring signal $S_{TX}+S_{RX}$. Due to the frequency offset between the pulse repetition frequency $f_{PRF}$ and the sampling frequency $f_{Sample}$, the sampling circuit 20 samples the total measuring signal $S_{TX}+S_{RX}$ in each period at a different phase position, whereby a time-expanded, intermediate frequency signal $S_{IF}$ is obtained with the above-described transformation factor $k_T$.

The sampling circuit 20 can be an HF-frequency converter, e.g. an HF-mixer, or a fast sampling switch. The sampling switch can be, for example, an HF-diode or a fast transistor.

The transformation factor $k_T$, or the time expansion factor, with which the total measuring signal $S_{TX}+S_{RX}$ is converted into a lower frequency, intermediate signal $S_{IF}$, corresponds, in such case, to a quotient of the pulse repetition frequency $f_{PRF}$ of the transmission signal $S_{TX}$ divided by a difference of the pulse repetition frequency $f_{PRF}$ of the transmission signal $S_{TX}$ and the sampling frequency $f_{Sample}$ of the sampling signal $S_{Sample}$.

$$k_T = \frac{f_{PRF}}{f_{Diff}} = \frac{f_{PRF}}{f_{PRF} - f_{Sample}} \triangleq \frac{f_{HF}}{f_{IF}} \quad \text{(Eq. 1)}$$

An intermediate frequency $f_{IF}$ of the intermediate frequency signal $S_{IF}$ produced in this way lies, in the case of apparatuses 1 of such type for ascertaining fill level e, usually in a frequency range of 50 to 200 kHz; in case required, the frequency range can, however, be selected to be higher or lower. Empirically, in the measuring devices of the assignee, the intermediate frequency is tuned to about 160 kHz. The dependence of the intermediate frequency $f_{IF}$ on the ratio of the sampling frequency $f_{Sample}$ and pulse repetition frequency $f_{PRF}$ can be derived from Eq. 1 as follows:

$$f_{IF} = f_{HF} \cdot \left(1 - \frac{f_{Sample}}{f_{PRF}}\right) \quad \text{(Eq. 2)}$$

In case required, the intermediate frequency signal $S_{IF}$, which is time-expanded relative to the total measuring signals $S_{TX}+S_{RX}$ by a transformation factor $k_T$, is amplified and filtered in suitable manner by a filter/amplifier unit 9 to provide a filtered intermediate frequency signal $S_{filtIF}$, before it is evaluated as echo curve or envelope curve in the control/evaluation unit 7 or other evaluation circuits.

For ascertaining the transformation factor $k_T$, it is necessary to know the frequency difference $f_{Diff}$, or the frequency offset of the pulse repetition frequency $f_{PRF}$ relative to the sampling frequency $f_{Sample}$. The frequency difference $f_{Diff}$ is, as evident in FIGS. 1, 2 and 3, ascertained by a frequency converter 11 or mixer. The frequency converter 11, or mixer, can be embodied either as a digital mixer 12, especially as an XOR logic component or a D flip-flop for mixing digital measuring signals, as an analog mixer 13, especially as a diode ring mixer or, generally, a multiplier, for mixing analog measuring signals. The frequency difference $f_{Diff}$ is determined for two reasons: First, by this control circuit, the instantaneous controlling and triggering of the sampling oscillator 17 and possibly also of the transmission oscillator 18 by the control/evaluation unit 7 is checked and, second, from the quotient of the known or measured, pulse repetition frequency $f_{PRF}$ and the frequency difference $f_{Diff}$, a transformation factor $k_T$ is ascertained in the control/evaluation unit 7. In the control/evaluation unit 7, then, additionally, the travel time t of the measuring signals, as well as the fill level e, can be ascertained by echo signal evaluation of the filtered, intermediate frequency signal $S_{filtIF}$ and knowledge of the transformation factor $k_T$. For determining a highly exact travel time t of the measuring signals, or distance d, the transmission clocking oscillator 18 is designed as a very stable, quartz oscillator. Without regard to that, the sampling clocking oscillator 17, and, in given circumstances, also the transmission clocking oscillator 18 are embodied to be controllable. The controllable, or tunable, oscillators 17, 18 are embodied in the LF-circuit portion of the transmitting/receiving unit 2, for example, as voltage-controlled oscillators VCO, or digitally, or numerically, controlled oscillators, e.g. NCO. By means of the control input 29 on the voltage-controlled oscillators VCO, these can be controlled from the control output 28 of the control/evaluation unit 7 via an integrating member provided in the control line 30 for forming from the digital signal sequences a corresponding direct voltage value. The digital, or numerically, controlled oscillators, e.g. NCO, are controlled directly with digital values on an existing control input 29 by means of a control line 30 or a parallel control bus 30 from the control output 28 of the control/evaluation unit 7. In the case of an application of digitally working, sampling clocking oscillators 17 and/or digitally working, transmission clocking oscillators 18, the ascertaining of the frequency difference is not absolutely necessary, since the digital production of the frequencies is accomplished via a counter in a phase-coupled control circuit, which is adjusted via a whole-numbered divider ratio of the input signals to the feedback signals or via the pulse-pause ratio of the digital signal. Since these digital control circuits control themselves and the stable, desired frequency is known, ascertaining of a frequency difference $f_{Diff}$ by a sequential sampling can, in principle, be omitted. In the case of application of digital or numerical oscillators, which can be integrated also in the control/evaluation unit 7, or in the microcontroller, ascertaining of the frequency difference $f_{Diff}$ of the two branches, the transmission branch with the pulse repetition signal $S_{PRF}$ and the sampling branch with the sampling signal $S_{Sample}$, by the application of a digital frequency converter, or digital mixer, 12, can be omitted.

An example of a digital, phase-coupled, control circuit is a phase locked loop, whose e.g. free-running, voltage controlled oscillator (VCO) is divided down by a, most often, adjustable divider to a fixed, first comparison frequency. These PLL circuit portions have the disadvantage that their electrical current consumption is very high and, consequently, they can not be used for a low-energy, two-conductor device.

Figure 2:
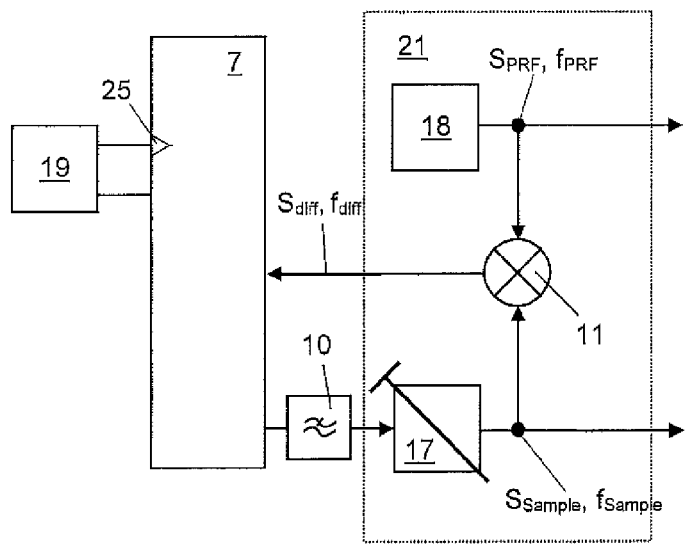
FIG. 2 is a sub portion of the block diagram of FIG. 1 showing the control circuit of the apparatus for producing the intermediate frequency, including delay circuit and control/evaluation unit according to the state of the art.
Figure 3:
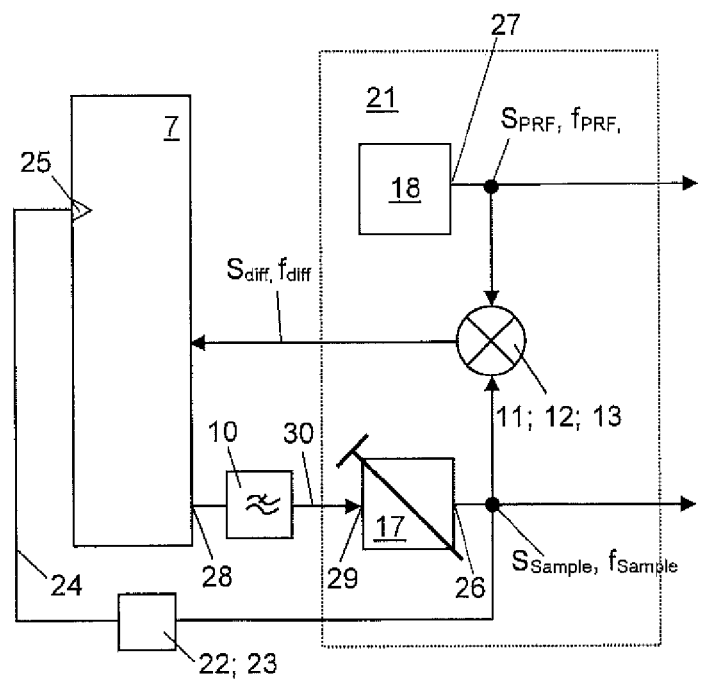
FIG. 3 is a block diagram showing the control circuit of the apparatus of the invention, with delay circuit and control/evaluation unit, for producing the intermediate frequency.

FIGS. 2 and 3 show a portion of the block diagram of FIG. 1 involving the control circuit of the apparatus for producing the intermediate frequency, including delay circuit 21 and control/evaluation unit 7. FIG. 2 shows the control circuit according to the state of the art. In this embodiment, the frequency difference $f_{Diff}$ is ascertained in the delay circuit 21 by sequential sampling of the pulse repetition frequency $f_{PRF}$ with the sampling frequency $f_{Sample}$ by means of a frequency converter 11. This frequency difference $f_{Diff}$ is, as described above, processed in the control/evaluation unit 7 and controlled according to the controllable sampling oscillator 17. This construction provides a control circuit which brings the frequency difference $f_{Diff}$ largely to the desired value, e.g. 21.74 Hz. Control/evaluation unit 7 is, in the state of the art, provided with its working rhythm by its own clock, or processor oscillator, 19. This clock, or processor oscillator, 19 can be embodied as an integral component of the control/evaluation unit 7 or as an external component, e.g. a quartz oscillator. Due to this construction, as a result of different temperature influences or other influences on the oscillators (17, 18, 19), various fluctuations arise in the periodicity, or frequency, of the processor oscillator 19 and the frequency difference $f_{Diff}$ of the sampling oscillator 17 and the transmission clocking oscillator 18, whereby errors result in the ascertaining of the frequency difference $f_{Diff}$ and, as a result, the transformation factor $K_T$. These errors resulting from different changes of the time periods in the sampling are referred to as jitter errors. In general, one labels as jitter the phase fluctuations and thus the time changes of signal frequencies. This can affect both amplitude as well as also frequency. An example of jitter is the error which arises in the converting of analog signals into digital signals or in the sequential sampling of signals a non-exact or -equal periodicity. In the sampling of analog signals, one uses, as above-described, a fixed time period, at which the amplitude values are read out. To summarize, it is evident that jitter errors arise from differences, or inaccuracies, in period lengths, and lead to erroneous amplitude values, for example in a sequential sampling of measuring signals.

FIG. 3 shows the control circuit of the invention for controlling frequency difference $f_{Diff}$ between two oscillators (17, 18) and skirting the problem of the different changes of the time bases in the control/evaluation unit 7 and the delay circuit 21. The difference in comparison with the previous control circuits is that the control/evaluation unit 7 is clocked on the time base of the sampling frequency $f_{Sample}$ by means of the sampling signal $S_{sample}$ provided on the first clocking signal output 26 of the sampling-clocking oscillator 17. For this, the first clocking signal output 26 of the sampling-clocking oscillator 17 is electrically connected via a clocking line 24 with the clocking input 25 of the control/evaluation unit 7. Due to this construction, an external or internal, processor oscillator 19 can be omitted, whereby an energy-consuming component is missing. Moreover, by this construction, there are, thus, no differences in the time bases for the calculating of the frequency difference $f_{Diff}$ in the control/evaluation unit 7 and the production of the frequency difference $f_{Diff}$ in the delay circuit 21, since the same time base, or the same clock signal, is used for both. The control/evaluation unit works clock-synchronously with the sampling-clocking oscillator 17, which is, in turn, controlled by this also corresponding to the ascertained frequency difference $f_{Diff}$ via a control signal. If the sampling frequency changes unbeknownst due to external influences, such as, for example, temperature changes or modulations of the supply voltage, or component-related, statistical fluctuations, such a frequency change acts equally on the production of the frequency difference $f_{Diff}$ in the delay circuit 21 and the ascertaining of the frequency difference $f_{Diff}$ or the transformation factor $k_T$ in the control/evaluation unit 7. Consequently, the frequency difference $f_{Diff}$ and the transformation factor $k_T$ are always correctly determined in the control/evaluation unit 7.

Beyond this, another option is to drive the clock input 25 of the control/evaluation unit 7 with the pulse repetition frequency of the pulse repetition signal, this not being explicitly detailed in the figures. The transmission clocking oscillator 18 producing the pulse repetition frequency is, most often, embodied as a highly stable clocking unit, or oscillator, since this is applied as reference clocking signal for the exact determining of the distance d from the product of the travel time t and the propagation velocity of the transmission signals or reflection signals. Very frequency-stable oscillators having a low jitter-error behavior include, for example, voltage-controlled, SAW-oscillators (VCSO—Voltage-Controlled-SAW-Oscillators).

The construction of the invention of the control/evaluation unit 7 with the delay circuit 21, as well as the use of the frequency-stable, transmission clocking oscillator 18 with low jitter characteristic have a positive effect on the performance, accuracy and reliability of the entire apparatus 1.

If the frequency of the sampling clocking oscillator 17 is too large or too small for the control/evaluation unit 7, a divider 22 or a multiplier 23 can, as required, be integrated into the clocking line 24 for changing the sampling frequency $f_{Sample}$ in accordance with a constant, set ratio.

The invention claimed is:

1. An apparatus for ascertaining and monitoring the fill level of a fill substance in a container, comprising:

a transmitting/receiving unit, which emits high-frequency, transmission signals directed at a surface of the fill substance, and which receives reflected signals, a delay circuit, which transforms the high-frequency, reflected signals and the high-frequency, transmission signals into an intermediate frequency signal, said delay circuit comprises at least a sampling clocking oscillator, which produces a sampling signal having a sampling frequency, a transmission clocking oscillator, which produces a pulse repetition signal having a pulse repetition frequency, and a frequency converter, which, by means of sequential sampling, produces from the pulse repetition signal and the sampling signal a difference signal having a frequency difference; and a control/evaluation unit, which, on the basis of travel time of the emitted, high-frequency, transmission signals and the received, high-frequency, reflected signals, determines the fill level of the fill substance in the container, wherein:

provided on said control/evaluation unit is an external clocking signal input, which is connected via a clocking line with a first clocking signal output of the sampling clocking oscillators or with a second clocking signal output of said transmission clocking oscillator, so that the clocking of said control/evaluation unit is done with the sampling signal at the sampling frequency or with the pulse repetition signal with the pulse repetition frequency.

2. The apparatus as claimed in claim 1, wherein:
said sampling clocking oscillator is embodied to be controllable.

3. The apparatus as claimed in claim 2, wherein:
a control output is provided on said control/evaluation unit, by which said control/evaluation unit controls or triggers said sampling clocking oscillator via a control line with the help of a control input on said sampling clocking oscillator.

4. The apparatus as claimed in claim 3, further comprising:
an integrating member in said control line between said control input of said sampling clocking oscillator and said control output of said control/evaluation unit, for forming from the digital control output signals of said control/evaluation unit a corresponding integral value.

5. The apparatus as claimed in claim 2, wherein:
said sampling clocking oscillator is embodied as a voltage-controlled oscillator (VCO).

6. The apparatus as claimed in claim 2, wherein:
said sampling clocking oscillator is embodied as a numerically controlled oscillator (NCO).

7. The apparatus as claimed in claim 1, wherein:
a high accuracy, stable oscillator with a stable pulse repetition frequency (fPRF) is provided as said transmission clocking oscillator.

8. The apparatus as claimed in claim 1, wherein:
said frequency converter is embodied as an analog mixer.

9. The apparatus as claimed in claim 1, wherein:
said frequency converter is embodied as a digital mixer.

10. The apparatus as claimed in claim 1, wherein:
provided in said clocking line between the clocking input of said control/evaluation unit and said first clocking output of said sampling clocking oscillator is a divider or a multiplier for changing, according to setting, the sampling frequency of the sampling signal.

* * * * *